Sept. 23, 1930. W. A. JONES 1,776,437
OIL STILL
Filed May 23, 1925 9 Sheets-Sheet 1

Fig. 1.

INVENTOR
William A. Jones
BY
Gifford & Scull
ATTORNEYS

Sept. 23, 1930.   W. A. JONES   1,776,437
OIL STILL
Filed May 23, 1925   9 Sheets-Sheet 2

Fig. 2.

INVENTOR.
William A. Jones
BY
Gifford & Scull
ATTORNEYS.

Sept. 23, 1930.   W. A. JONES   1,776,437
OIL STILL
Filed May 23, 1925   9 Sheets-Sheet 5

INVENTOR
William A. Jones
BY
Gifford & Scull
ATTORNEYS

Sept. 23, 1930.  W. A. JONES  1,776,437
OIL STILL
Filed May 23, 1925  9 Sheets-Sheet 6

INVENTOR.
William A. Jones
BY
Gifford & Beall
ATTORNEYS.

Sept. 23, 1930.  W. A. JONES  1,776,437
OIL STILL
Filed May 23, 1925  9 Sheets-Sheet 9

INVENTOR
William A. Jones
BY
Gifford & Scull
ATTORNEYS

Patented Sept. 23, 1930

1,776,437

UNITED STATES PATENT OFFICE

WILLIAM A. JONES, OF WEST NEW BRIGHTON, NEW YORK, ASSIGNOR TO THE BABCOCK & WILCOX COMPANY, OF BAYONNE, NEW JERSEY, A CORPORATION OF NEW JERSEY

OIL STILL

Application filed May 23, 1925. Serial No. 32,259.

My present invention relates to oil stills, and particularly the support and setting of such stills so as to increase their efficiency and safety in operation. My invention will be best understood from the following description and the annexed drawings of an illustrative form of oil still embodying my invention.

In the drawings, Fig. 13 is a view similar to Fig. 12 with some of the parts removed, Fig. 13 being a plan view of the corner of the setting of the still adjacent that of which Fig. 12 is a part; Fig. 17 is an enlarged view of a portion of Fig. 1; Fig. 18 is a section on the line 18—18 of Fig. 17, showing only a few of the bank of tubes, however; Fig. 19 is a plan of a portion of a detail of Figs. 17 and 18; Fig. 20 is an enlarged section on the line 20—20 of Fig. 19; Fig. 21 is a plan and Fig. 22 is a section on the line 22—22 of Fig. 21 of one form of tile used in the arrangement shown in Figs. 17 and 18; Fig. 23 is a plan and Fig. 24 a section on the line 24—24 of Fig. 23 of another of such tile; Fig. 25 is a plan and Fig. 26 a section on the line 26—26 of Fig. 25 of still another form of such tile; Fig. 27 is a plan and Fig. 28 a section on the line 28—28 of Fig. 27 of still another of such tile; Fig. 29 is a plan and Fig. 30 an end view of one of the metal plates of the arrangement shown in Figs. 17 and 18; Fig. 31 is a side view and Fig. 32 an end view of another form of such plate.

Like reference characters indicate like parts throughout the drawings.

In oil stills of the kind which I have adopted for purposes of illustration of my invention, it is usual to have a plurality of such stills arranged side by side in a battery and in illustrating my invention, I have shown in various figures a portion of such a battery to illustrate the relative arrangement of the individual stills in such a battery. Since each still is a duplicate of every other still in the battery, it will be sufficient to describe one of such stills only.

Figure 2:
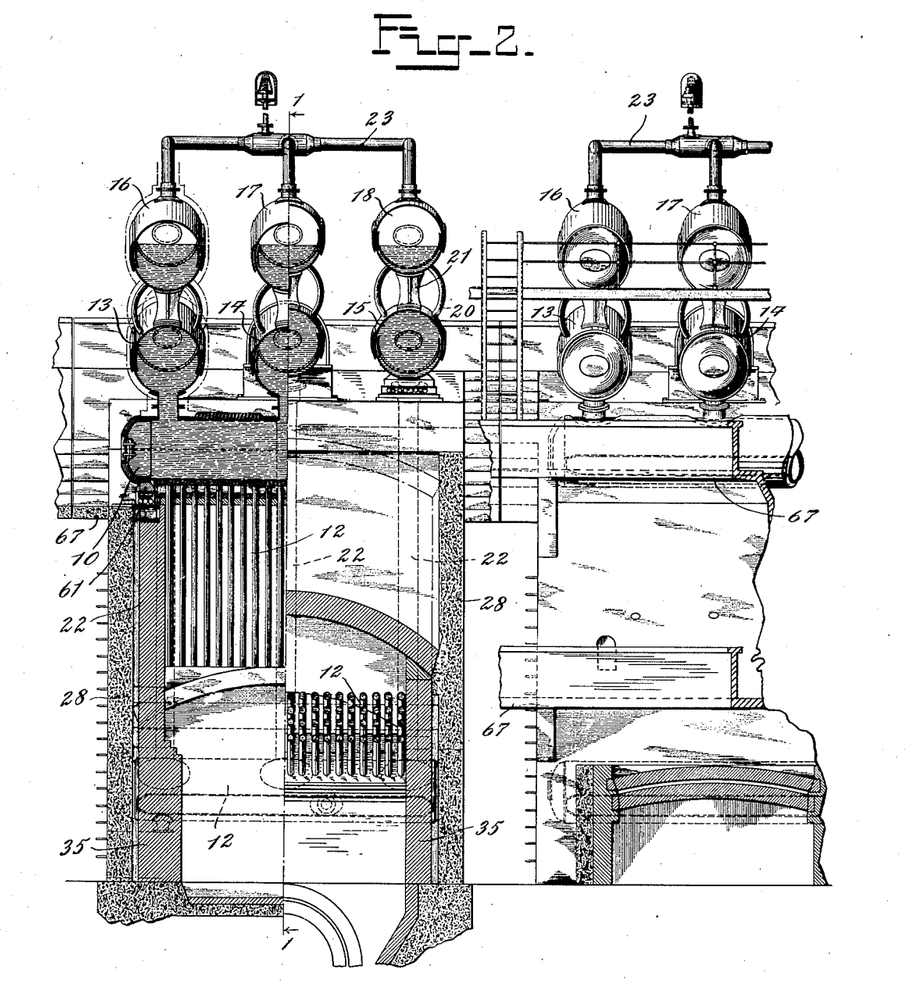
Fig. 2 is a front view of a portion of a series of oil stills such as shown in Fig. 1, the right-hand portion of the figure being a front view, partly in section, of one of such stills and its setting, the central portion being a section on the line 2ª—2ª of Fig. 1 and the left-hand portion being a section on the line 2ᵇ—2ᵇ of Fig. 1.
Figures 3, 4:
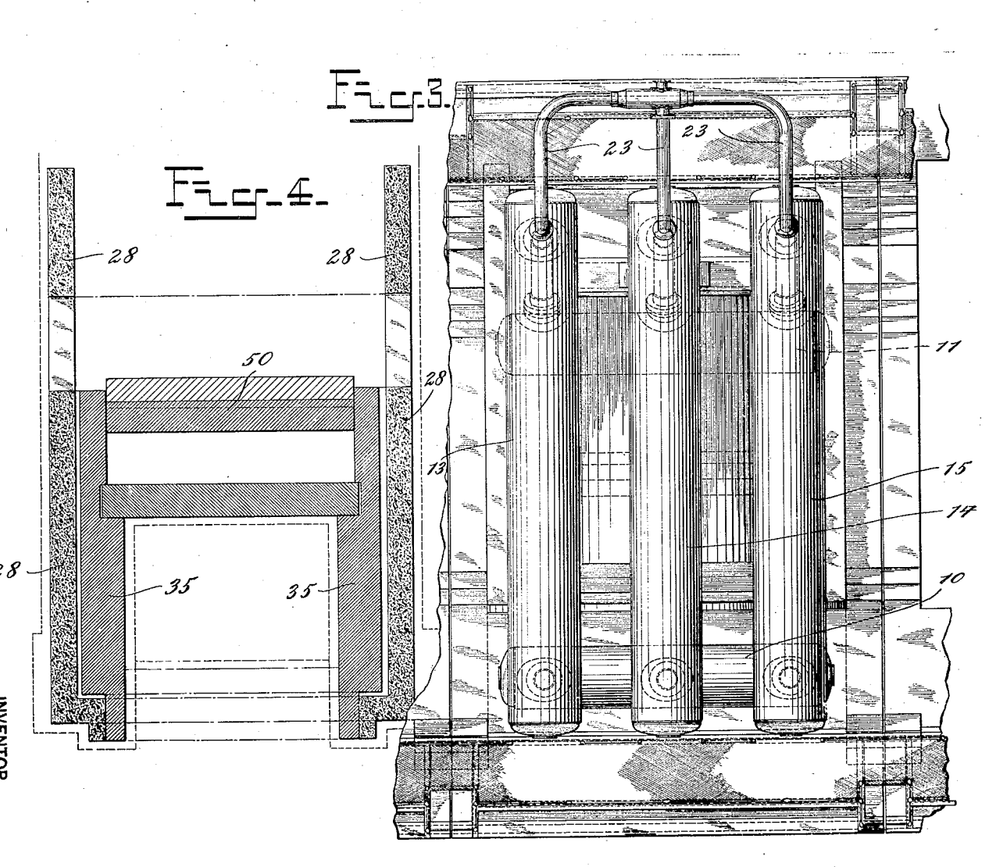
Fig. 3 is a plan view of the still shown in Fig. 1.
Fig. 4 is a section on the line 4—4 of Fig. 1.

In the illustrative embodiment, the still has an upper cross drum 10 and a lower cross drum 11 connected by a bank of steeply inclined tubes 12. Above the cross drum 10 are six longitudinal drums arranged in an upper and a lower tier of three each, the lower tier being made up of the drums 13, 14 and 15 and the upper tier of the drums 16, 17 and 18. Each of the drums 13, 14 and 15 is connected directly to the cross drum 10 through flanged couplings 19 and each upper drum is connected to and supported on one of the lower longitudinal drums by curved nipples 20, expanded into the drums and curved outward, as best shown in Fig. 2. In addition, supports or saddles 21 may be provided between an upper and a lower drum to support the drums, particularly while the nipples 20 are being expanded into the drums and also to support the upper drum in case of failure of the nipples 20.

The rear end of each of the drums 13, 14 and 15 is connected through a pipe 22 of large cross-section to the lower cross drum 11. The upper longitudinal drums are inclined to the horizontal and the gases and vapors from the still are taken off through the outlet pipe 23.

In the illustrative arrangement, the tubes 12 are heated by hot gases from a chain grate stoker 24, the furnace chamber being arranged so that the radiant heat from the fire is substantially entirely cut off from the heating tubes 12 and the gases are directed across and along these tubes to a gas outlet 25.

The furnace chamber is made up primarily of a monolithic structure in which the vertical walls are continuous around the chamber, and such monolithic structure is used to support the weight of the still. In the illustrative embodiment, this monolithic structure has a front wall 26, a rear wall 27 and side walls 28, 28. In the still illustrated, the hot gases are prevented from contacting with any of the drums, or, in fact, with anything except the heating tubes of the still. It is, therefore, essential to provide a roof over the furnace chamber and to provide means by which the heating tubes may extend into the furnace chamber while the drums to which these tubes are connected are outside of the chamber. To this end, I provide a roof arch 29 of refractory brick which is sprung from the monolithic side walls 28, a skew-back being cast in the side walls 28, as may be seen, for instance, in Fig. 2. The arch 29 has its axis substantially parallel with the tubes 12, the lower courses of the brick for the arch 29 resting on an inturned portion of the rear wall 27.

Beneath the roof arch 29 and also sprung from the monolithic side walls 28 is an upper horizontal arch 30 and a middle horizontal arch 31. These two arches are substantially the same and a description of one will suffice for both. The arches 30 and 31 are positioned and curved so that no part of them intersect the roof arch 29, so that special shapes of brick, due to such intersection, are avoided. As shown best in Figs. 33 and 34, the space between the upper end of the roof arch 29 and the upper arch 30 is filled in partly by specially shaped refractory brick 32 and courses of brick 33.

Figures 33, 34, 35, 36, 37:
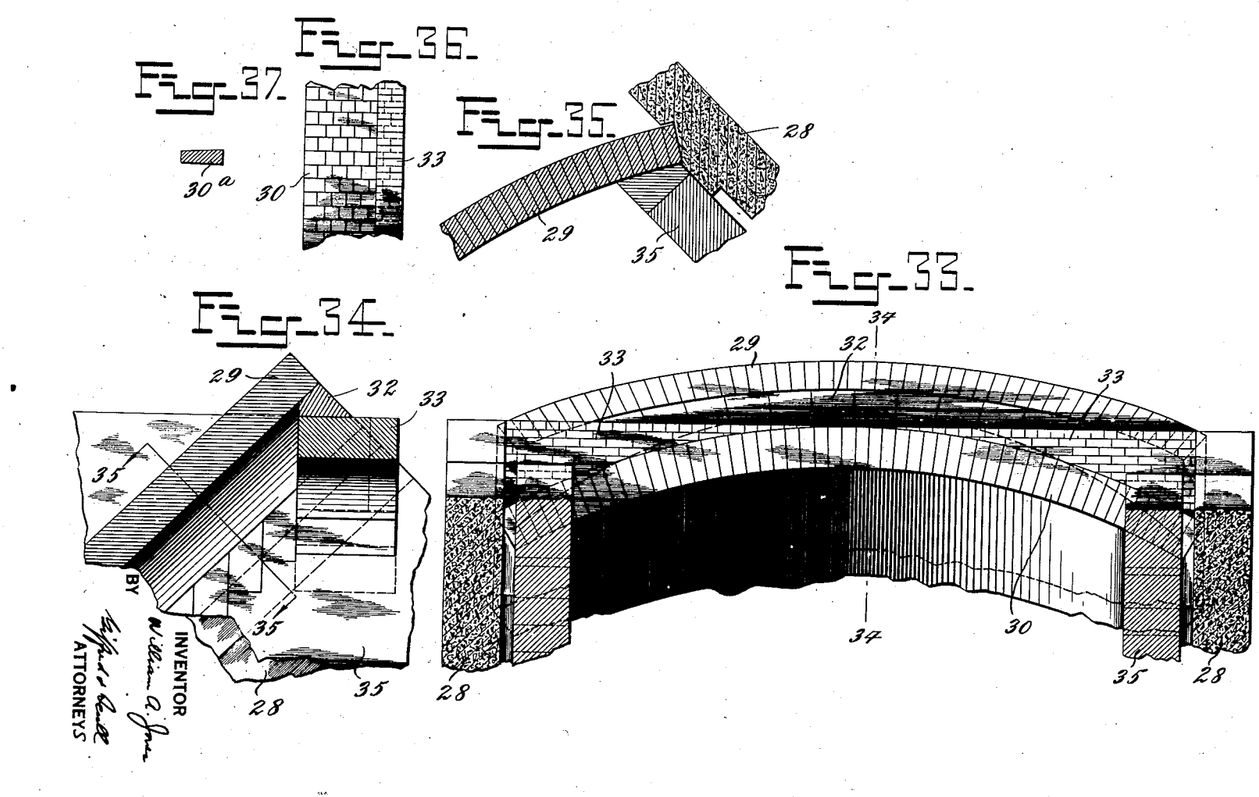
Fig. 33 is an enlarged front view of a portion of the roof arch shown in Fig. 1.
Fig. 34 is a section on the line 34—34 of Fig. 33.
Fig. 35 is a section of one end of the arch taken on the line 35—35 of Fig. 4.
Fig. 36 is a plan of a portion of Fig. 34.
Fig. 37 is a side sectional view of an arch brick of Fig. 36.
Figure 38:
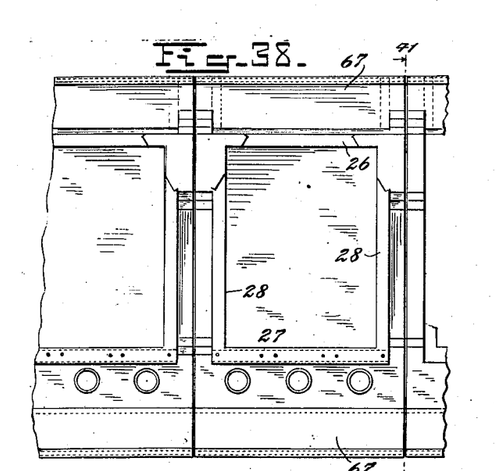
Fig. 38 is a plan view of the monolithic setting for the stills of Fig. 1, a setting for one still being shown and the settings for two adjacent stills being shown partly broken away.
Figure 39:
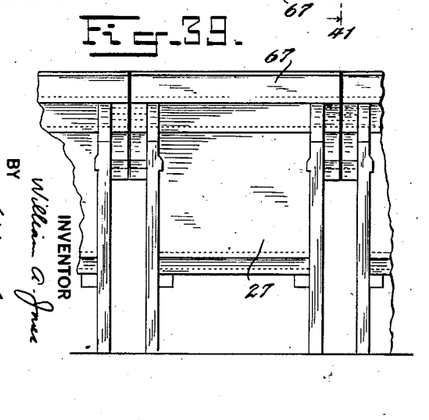
Fig. 39 is a rear view of the setting shown in Fig. 38.
Figure 40:
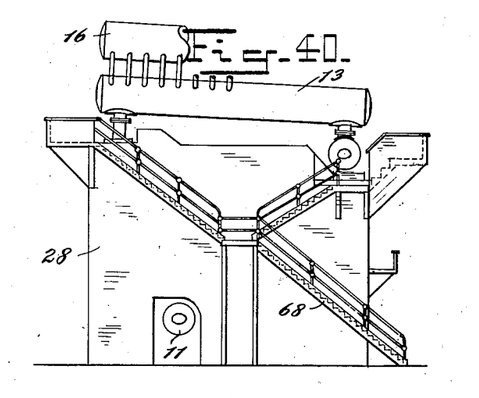
Fig. 40 is a side view of the setting at one end of a row of stills.
Figures 41, 42:
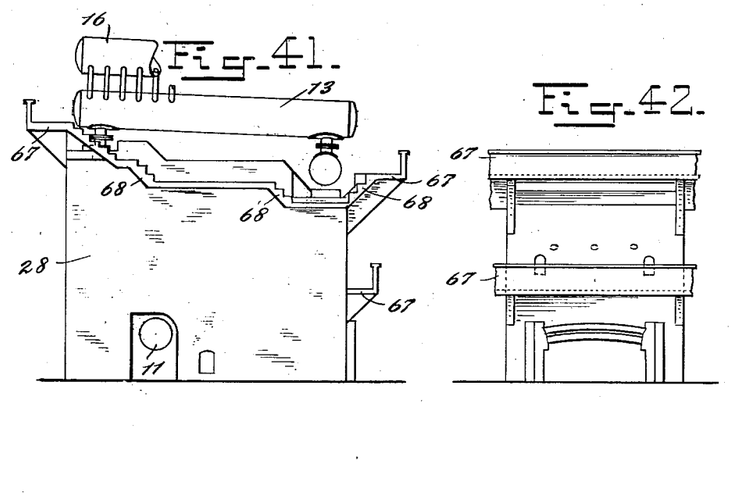
Fig. 41 is a side view on the line 41—41 of Fig. 38 showing a side elevation of the setting of one of the intermediate stills in the row.
Fig. 42 is a front view of a portion of the setting shown in Fig. 38.

The arch 30 is made up of wedge-shaped tile 30ª, these tile being set as shown in Fig. 36 so as to break joints.

Inside of the monolithic walls I provide walls of refractory brick, the front wall 34 extending from the combustion arch to the top of the front wall 26 and the side walls 35 extending up to the roof arch 29. These refractory walls 34 and 35 protect the monolithic walls from the heat and preferably are separated from the monolithic walls by a space.

The arch 30 with the refractory which fills the space between the arch 30 and the roof 29, form a part of a closure for the upper end of the roof arch and a support for the ends of the frame pieces of a seal for the upper ends of the tubes 12, to be described hereafter. In the illustrative embodiment, the remainder of this closure is made up of a plurality of tile-lined metallic pieces which are supported at one end on the arch 30 and at the other on the top of the wall 34. As shown best in Figs. 17 and 18, these metallic pieces are each provided with a broad end 36 and a narrow extension 37 with projections 38 resting on the arch 30, the opposite end of the metallic piece being provided with a projection 39, this lower end resting on the top of the wall 34 in a recess provided therein. One metal piece is provided for each space between a row of the tubes 12, the narrow portions 37 being made small enough to pass freely between the tubes of two adjacent rows.

Figures 17, 18, 19, 20, 21, 22, 23, 24, 25, 26, 27, 28, 29, 30, 31, 32:
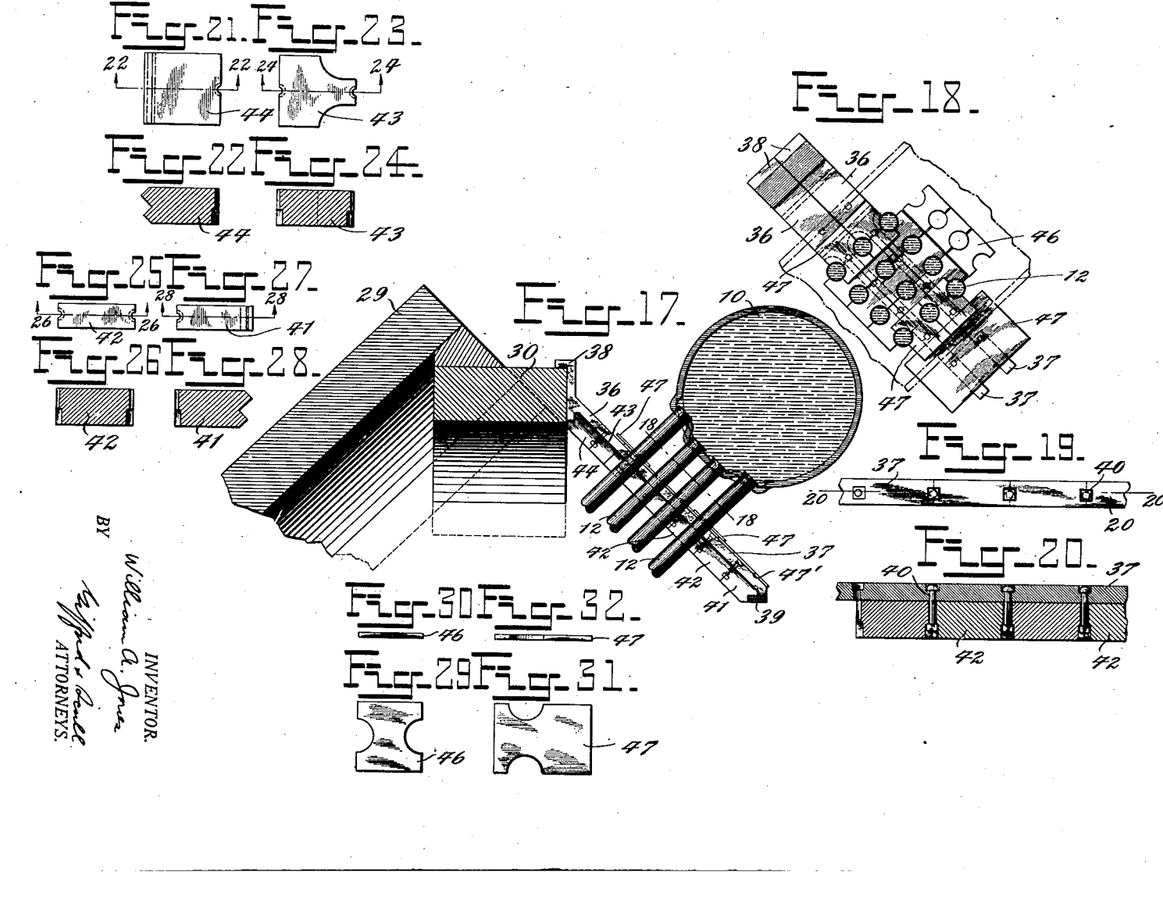

Beneath each narrow portion 37 of the metallic pieces is suspended a row of tile by means of hanger bolts 40, these tile preferably being made with half-round recesses which surround the bolts 40 and the lowermost tile 41 of each metallic piece is provided with a notch which engages with the projection 39 to lock the tile in place. Tiles 42 are then strung along the narrow portion 37, special tile 43 being provided at the upper end of the row and finally another special tile 44 which has a notch in its edge engaging with a projection on the wide portion 36 of the frame piece. It will be noted that in the arrangement described, the tile are securely held to each of the metal pieces, the bolts 40 holding the tile against the metal piece and the projection 39 carrying a large part of the weight of the tile. Moreover, each metal piece can be held in place without fastening so that it may move to adjust itself, if necessary, due to the relative motion between the tubes of the bank.

The tiles 43 are shaped so that there is considerable space between the edges of the tile and the tubes 12, so that there might be considerable gas leakage. To seal these spaces, I provide overlapping layers of thin metallic plates 46 and 47, each plate of which fits between a pair of tubes and one layer of such plates is laid with its side edges parallel to the axis of the drum 10 and the other layer with the side edges at right angles to such axis. By this means, the spaces between the tile and the tubes are effectively sealed, while at the same time, relative motion between the tubes is permitted.

The space above the monolithic walls 28 and the ends of the seal supported on the metallic frame pieces 36 is filled with a wall 28' of fire brick resting on the monolithic wall 28.

The arch 31 serves to direct the gases flowing over the bridge wall 31ª along the tubes 12. Without this arch, the gases would tend to travel just beneath the roof arch 29 and above the tubes 12.

Figure 5:
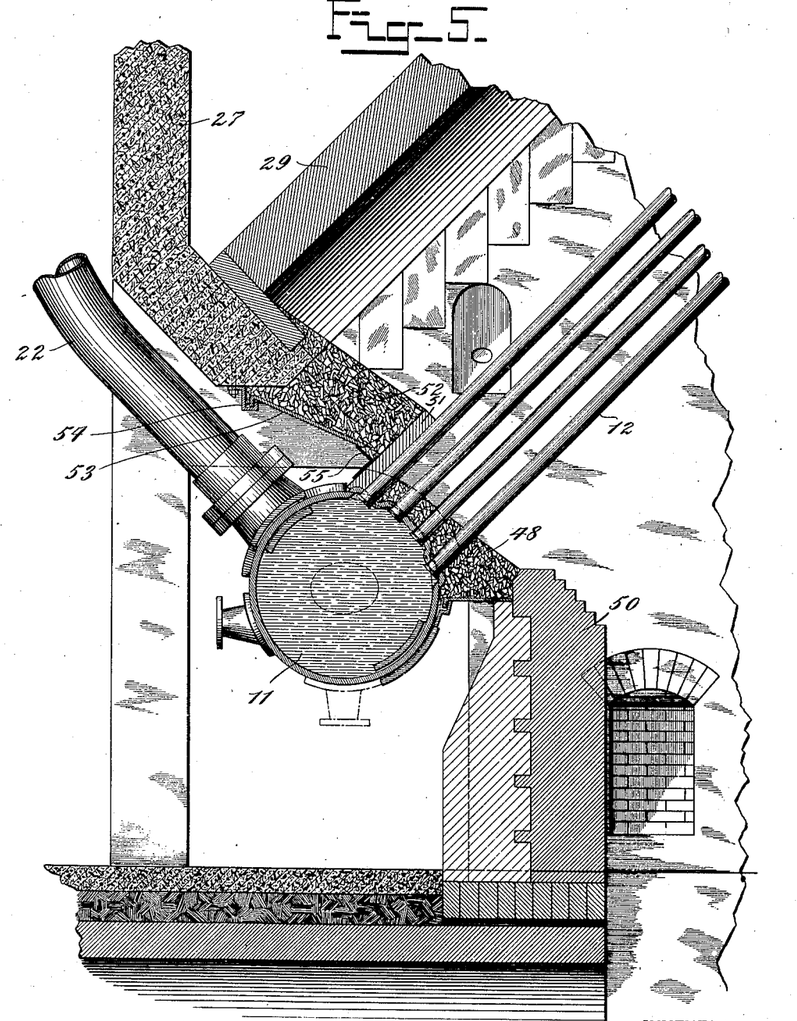
Fig. 5 is an enlarged view of a portion of Fig. 1.
Figures 6, 8:
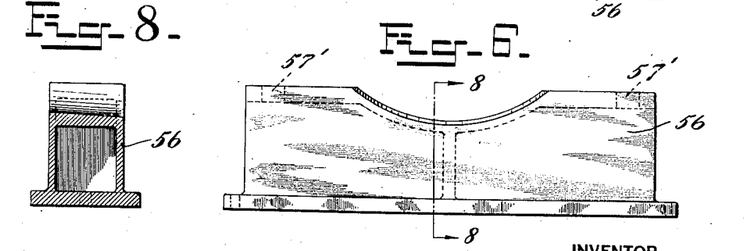
Fig. 6 is a front view and Fig. 7 a plan view of a detail shown in Fig. 1.
Fig. 8 is a section on the line 8—8 of Fig. 6.
Figure 7:
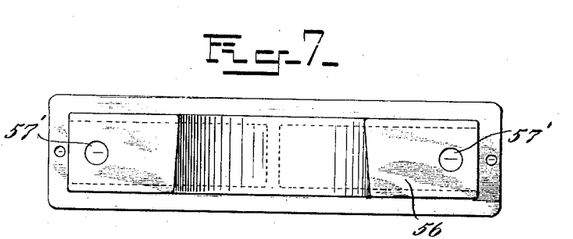

At the lower end and adjacent the drum 11, the tubes 12 are sealed in the furnace chamber and, at the same time, the drum 11 protected from the heat of the furnace by a mass of heat-insulating material, such as magnesia or asbestos, such a mass being shown at 48 as resting on the drum 11 and a plate 49 extending from the drum 11 to the wall 50. Tile 51 rest on the top row of the tubes 12 and another mass of heat-insulating material 52 rests on this tile 51 and a plate 53, this plate being provided with a hook at its upper end engaging a metal hook 54 and its lower end resting on a metal piece 55 connected to the tile 51. With the arrangement shown in Fig. 5, it will be obvious that the drum 11 and the tubes 12 may move in relation to the walls 27 and 50 without breaking the gas seals because of the free motion which I have provided between the several plates for supporting the heat-insulating material and, by reason of the ability of the heat-insulating material itself to yield to respond to pressure.

Since the still is subjected to very considerable changes in temperature and since the possibility of breaking a joint due to unequal expansion is increased thereby, I have provided special means by which the several parts may be supported and yet be free to adjust themselves without producing undue strains on any of the joints.

Figure 9:
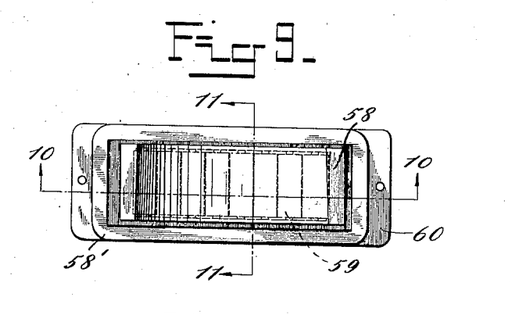
Fig. 9 is a plan view of a detail of the still shown in Fig. 1, Fig. 10 being a section on the line 10—10 of Fig. 9 and Fig. 11 being a section on the line 11—11 of Fig. 9.
Figure 10:
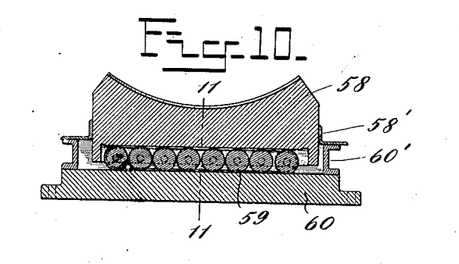
Figure 11:
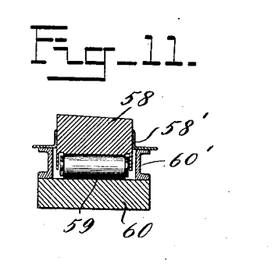

Beneath the rear of the middle lower drum 14 I provide a fixed saddle 56 which is anchored to the top of the wall 27 and to which the drum 14 may be held by a strap 57 having its ends passing through holes 57' in the saddle 56. The rear end of each of the lower drums 13 and 15 is supported on a movable saddle, one form of which is shown in Figs. 9, 10 and 11. The saddle portion 58 rests on a nest of rollers 59 which, in turn, rests on a base 60, this latter being fastened to the top of the wall 27. A frame 60' made up of channel sections surrounds the nest of rollers, being removably attached to the base 60. Angles 58' attached to the saddle portion 58, cover the space between the frame 60' and the saddle portion 58, being attached to the saddle and free to slide on the frame. The frame 60' and angles 58' serve to exclude dirt from the retain grease in the rollers 59. It will be observed that the saddle 58 will permit the rear ends of each of the drums 13, 15 to move freely horizontally at right-angles to the axes of these drums.

Figure 12:
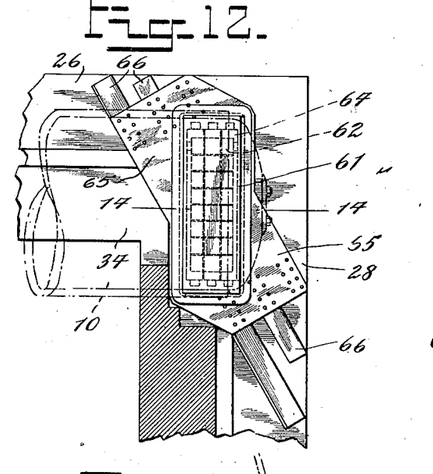
Fig. 12 is a plan view of one corner of a setting showing a drum support for the still shown in Fig. 1.
Figure 13:
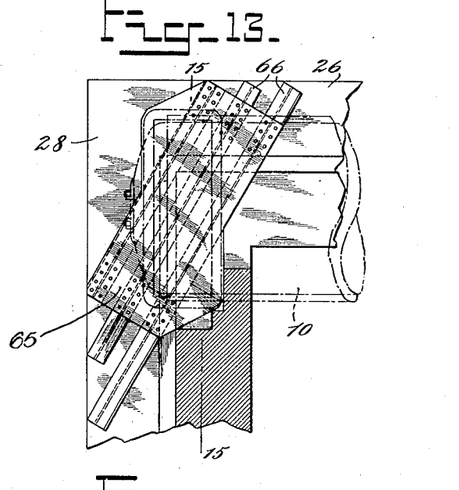
Figure 14:
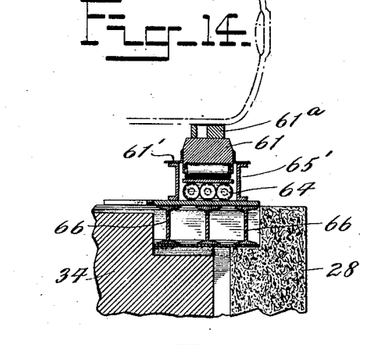
Fig. 14 is a section on the line 14—14 of Fig. 12.
Figure 15:
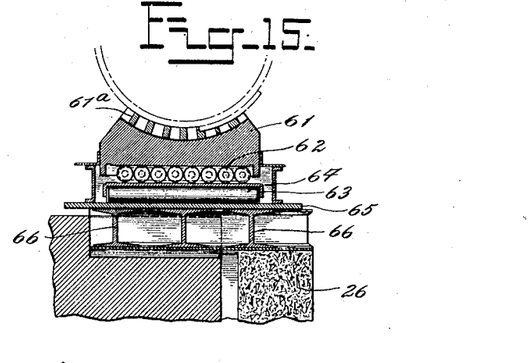
Fig. 15 is a section on the line 15—15 of Fig. 13.
Figure 16:
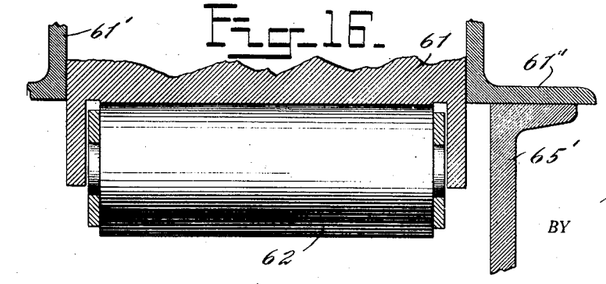
Fig. 16 is an enlarged detail of Fig. 14.

The cross drum 10 is mounted at either end on a separating piece 61ª which rests on a movable saddle 61 provided with a nest of rollers 62 which rest on a movable plate 63 resting, in turn, on a nest of rollers 64 which run on a plate 65, this plate being supported by means 66 extending across the corners of the monolithic walls 26, 28. In Fig. 12, the saddle 61 is shown in place and in Fig. 13, the plate 65 for supporting the saddle is shown, with the position of the saddle indicated in dotted lines. It will be understood that Figs. 12 and 13 represent adjacent corners of the furnace chamber walls of two adjacent still settings, the space between them providing room for a workman to enter the manholes provided in the ends of the drums 10. It will also be observed that the rollers 64 have their axes at right-angles to the rollers 62 and that suitable framework connected to the plates 65 is provided for maintaining the moving parts in proper relation. A frame 65' and angles 61' are provided in the same manner and for the same purpose as frame 60' and angles 58'. The separating piece 61ª may be provided with openings and recesses to accommodate the rivet heads and the butt strap at the end of the drum 10.

In order to have access to the various parts of the still and, at the same time, to provide stiffening members for the monolithic furnace chamber walls, I provide horizontal platforms 67 and stairs 68 at desired points which, by reason of their integral connection with the vertical monolithic walls, obviously strengthen such walls against outward pressure.

Figure 1:
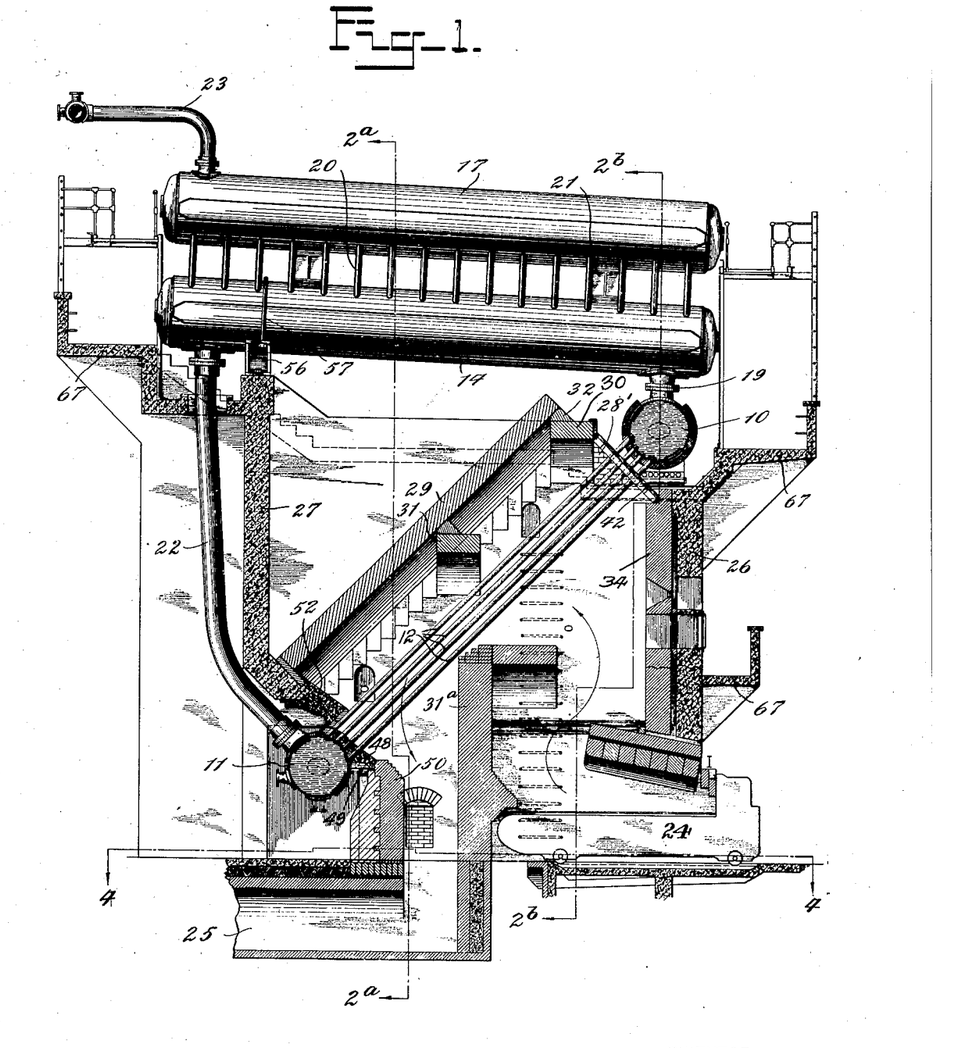
Fig. 1 is a vertical longitudinal section of the illustrative still taken on the line 1—1 of Fig. 2.

With the arrangement described, the hot gases will first flow upward, as indicated by the arrows in Fig. 1, and will then be diverted downward by the roof arch 29 and the closure at the upper end thereof and, after flowing partly along and partly across the tubes, will flow downward through the gas outlet 25. The expansion and contraction of the drums 10 and 11 and of the upper longitudinal drums will not disturb the relation of the various parts, because as the upper drum 10 expands, it will carry the end drums 13 and 15 with it, this longitudinal motion of the drum 10 being provided for by the rollers 64. The longitudinal motion of the upper longitudinal drums will be taken care of by moving the drum 10 bodily at right-angles to its axis, this motion being taken care of by the rollers 62. As has been explained, the lower middle longitudinal drum 14 is anchored at its rear end and the movable saddles 58 permit the rear ends of the drums 13 and 15 to move at right-angles to their axes so as to relieve strain on the pipes 22, due to the expansion of the lower cross drum 11.

As the drum 10 expands longitudinally, the spacing between the tubes 12 will be changed slightly, but such spacing will not break the upper seal because of the motion permitted between the several parts and the tile-lined metallic closure, and the seal will not be broken at the lower part because of the masses of heat-insulating material surrounding the tubes at that point.

By bending the pipes 22, as shown in Fig. 1, provision is made for the changing of the relative positions of drums 11 and 14 when tubes 12 are first heated and therefore elongated and before the heated oil has expanded the other parts of the still. Similarly, the curved, relatively flexible, nipples 20 provide for relative motion between drums 14 and 17 due to the expansion of the lower drum, on starting up the still, before the upper drum has become heated.

By providing a monolithic wall, I guard largely against dangers which might arise from explosions within any one setting of a row. If, due to leakage, inflammable oil or gases accumulate in any one setting, a refractory brick wall would not be able to resist the pressure of such explosion and such an explosion would not only destroy its own setting, but the results would be transmitted to one or more other settings in the battery. By providing a monolithic wall of reinforced concrete, particularly when such wall is strengthened by the extension platforms, I provide a wall which will stand the pressure of most explosions, at least until such pressure is relieved by the destruction of the roof arch 29, thus relieving the expanding gases. But such reinforced concrete walls are not able to resist heat and, therefore, I provide the inner walls of heat-resisting material to protect the monolithic walls.

The arrangement which I have described is merely illustrative and it will be obvious that its embodiment may be widely varied. In some of the appended claims when I refer to the front and the rear of the setting, it will be understood that such terms are used only relatively, since clearly the several parts may be varied in their relation to the front of the setting without departure from my invention.

I claim:

1. A fluid heater having a plurality of parallel upper longitudinal drums, a cross drum, connections between each of said longitudinal drums and said cross drum, a supporting wall beneath the ends of said longitudinal drums, a fixed connection between said wall and one of said longitudinal drums and a sliding support between said wall and the remainder of said longitudinal drums, whereby said remaining drums may move toward and away from the fixed drum.

2. A fluid heater having a plurality of upper longitudinal drums, a front cross drum beneath and connected to the front ends of said longitudinal drums, a wall located at the rear ends of said longitudinal drums, a fixed connection between said wall and the rear end of one of said longitudinal drums, a supporting wall beneath said cross drum, and sliding supports between said last mentioned wall and the ends of said cross drum arranged to permit each of said ends to move freely longitudinally of the axis of said cross drum, and said cross drum to move bodily at right angles to its axis.

3. A fluid heater having a plurality of upper longitudinal drums, a front cross drum beneath and connected to the front ends of said longitudinal drums, a rear cross drum beneath and connected to the rear ends of said longitudinal drums, supporting walls at the front and the rear ends of said longitudinal drums, a fixed connection between the rear wall and the rear end of one of said longitudinal drums, a sliding support between the rear ends of the remainder of said longitudinal drums and the rear wall and a sliding support beneath said front cross drum and the front wall, said sliding supports being arranged to permit said front cross drum to move freely longitudinally of and at right-angles to the axis of said front drum.

4. A fluid heater having a plurality of upper longitudinal drums, an upper cross drum beneath and connected to the front ends of said longitudinal drums, a lower cross drum beneath the rear ends of said longitudinal drums, a pipe connecting the rear end of each of said longitudinal drums with said lower cross drum, tubes connecting said cross drums, a rear wall beneath the rear ends of said longitudinal drums to support the same, a front wall beneath said upper cross drum to support the same, a fixed connection between the rear end of one of said longitudinal drums and the rear wall, a sliding connection between the rear end of each of the remainder of the longitudinal drums and the rear wall, and a sliding connection between said upper cross drum and the front wall.

5. A fluid heater, a furnace chamber having refractory brick walls surrounding the heating surfaces of said heater, a monolithic wall of hardened poured material surrounding said refractory walls and supporting said heater, and an arch of refractory brick forming a roof over said heating surface, said arch being sprung from said monolithic wall.

6. A fluid heater, a furnace chamber having refractory brick walls surrounding the heating surfaces of said heater, a monolithic wall of hardened poured material surrounding said refractory walls and supporting said heater, an arch of refractory brick forming a roof over said heating surface, said arch being sprung from said monolithic wall, and a second arch of refractory brick extending over said heating surface, said second arch being sprung from said monolithic wall.

7. A fluid heater having a bank of heating tubes steeply inclined to the horizontal, an upper and a lower drum connected to the ends of said tubes, a furnace chamber surrounding the major portion but less than the entire portion of said tubes, said furnace chamber having inner walls of refractory brick, an outer surrounding monolithic wall of hardened poured material and a roof arch over said tubes, with the axis of the arch substantially parallel to the axes of said tubes and said arch being sprung from said monolithic wall.

8. A fluid heater having a bank of heating tubes steeply inclined to the horizontal, an upper and a lower drum connected to the ends of said tubes, a furnace chamber surrounding the major portion of said tubes, a roof arch over said tubes with its axis substantially parallel to the axes of said tubes, and a closure between the high end of said arch and the adjacent wall of the furnace chamber and extending across the bank of tubes, said closure including a metallic framework, tile supported from said framework and having enlarged recesses for said tubes, and metal plates having recesses for said tubes, and arranged to cover the enlarged openings in the tile.

9. A fluid heater having a bank of heating tubes steeply inclined to the horizontal, an upper and a lower drum connected to the ends of said tubes, a furnace chamber surrounding the major portion of said tubes, a roof arch over said tubes with its axis substantially parallel to the axes of said tubes, a second arch with its axis horizontal and located at the upper end of said roof arch to form part of the closure between said roof arch and the bank of tubes, and a closure between said second arch and the adjacent wall of the furnace chamber and extending across the bank of tubes, said closure including a series of metallic frame pieces with their ends supported on said last-named arch and said front wall and extending between the rows of tubes of said bank, and tile supported on the underside of said frame pieces and having enlarged recesses for said tubes.

10. A fluid heater having a bank of heating tubes steeply inclined to the horizontal, an upper and a lower drum connected to the ends of said tubes, a furnace chamber surrounding the major portion of said tubes, a roof arch over said tubes with its axis substantially parallel to the axes of said tubes, a second arch with its axis horizontal and located at the upper end of said roof arch to form part of the closure between said roof arch and the bank of tubes, a closure between said second arch and the adjacent wall of the furnace chamber and extending across the bank of tubes, said closure including a series of metallic frame pieces with their ends supported on said last-named arch and said front wall and extending between the rows of tubes of said bank, tile supported on the underside of said frame pieces and having enlarged recesses for said tubes, and metal plates having recesses for said tubes and arranged to cover the enlarged recesses in said tile.

11. A fluid heater having a bank of inclined tubes and a cross baffle extending across the bank, said baffle comprising a plurality of metallic frame pieces supported at their ends and each extending across the bank between a row of tubes, tile supported on the underside of each of said pieces and arranged to provide enlarged spaces around each of the tubes and closure plates on the upper side of said frame pieces, each positioned between a pair of tubes with recesses in its edge for the tubes, and extending over the joints between the metallic frame pieces.

12. A fluid heater having a bank of heating tubes steeply inclined to the horizontal, an upper and a lower drum connected to the ends of said tubes, a furnace chamber surrounding the major portion of said tubes, a roof arch over said tubes with its axis substantially parallel to the axes of said tubes and sprung from said furnace wall, a second arch sprung from said furnace wall and having its axis horizontal, said second arch being located beneath said roof arch and out of contact therewith, and a filling wall in the space between the arches.

13. A fluid heater having a bank of heating tubes steeply inclined to the horizontal, an upper and a lower drum connected to the ends of said tubes, a furnace chamber surrounding the major portion of said tubes, a roof arch over said tubes with its axis substantially parallel to the axes of said tubes and sprung from said furnace wall, a second arch sprung from said furnace wall and having its axis horizontal, said second arch being located beneath said roof arch and out of contact therewith, a filling wall in the space between the arches, said furnace walls being monolithic, and walls of refractory material inside said monolithic walls and extending up to said arches.

14. A fluid heater having a plurality of parallel upper longitudinal drums, a cross drum, connections between each of said longitudinal drums and said cross drum, a supporting wall beneath the ends of said longitudinal drums, a fixed connection between said wall and one of said longitudinal drums and a sliding support between said wall and the remainder of said longitudinal drums, constructed and arranged to permit said remaining drums to move toward and away from the fixed drum, and a plurality of longitudinal inclined drums above said first named longitudinal drums and connected thereto by outwardly curved tubes.

15. A fluid heater having a plurality of parallel upper longitudinal drums, cross drums connected by steeply inclined tubes, connections between each of said longitudinal drums and said cross drums, a supporting wall beneath the ends of said longitudinal drums, a fixed connection between said wall and one of said longitudinal drums and a sliding support between said wall and the remainder of said longitudinal drums, constructed and arranged to permit said remaining drums to move toward and away from the fixed drum.

16. A fluid heater having a plurality of parallel upper longitudinal drums, cross drums connected by steeply inclined tubes, connections between each of said longitudinal drums and said cross drums, a supporting wall beneath the ends of said longitudinal drums, a fixed connection between said wall and one of said longitudinal drums and a sliding support between said wall and the remainder of said longitudinal drums, constructed and arranged to permit said remaining drums to move toward and away from the fixed drum, and a furnace through which said tubes extend, the roof of said furnace being parallel to said tubes.

WILLIAM A. JONES.